United States Patent [19]

Kane

[11] 4,006,607
[45] Feb. 8, 1977

[54] CONSTANT SPEED RATIO COUPLING FOR SHAFTS WITH TIME-VARYING ORIENTATIONS

[76] Inventor: Thomas R. Kane, 817 Lathrop Drive, Stanford, Calif. 94305

[22] Filed: Aug. 20, 1975

[21] Appl. No.: 606,117

[52] U.S. Cl. .................................. 64/21; 64/18; 74/710
[51] Int. Cl.² .................................. F16D 3/30
[58] Field of Search ............ 64/21, 7, 8, 18; 74/710, 710.5, 711

[56] References Cited

UNITED STATES PATENTS

| | | | |
|---|---|---|---|
| 2,768,698 | 10/1956 | Fabian | 64/18 |
| 3,036,446 | 5/1962 | Morgenstern | 64/18 |
| 3,924,420 | 12/1975 | Falk | 64/21 |
| 3,924,480 | 12/1975 | Carapellucci | 74/710 |
| 3,961,497 | 6/1976 | Cohen | 64/18 |

*Primary Examiner*—Samuel Scott
*Assistant Examiner*—R. Heald

[57] ABSTRACT

A homokinetic coupling is disclosed for coupling two rotatable shafts each having an axis of rotation such that the ratio of the speeds of rotation of said shafts about their respective axes is maintained constant even as said axes undergo relative time-varying re-orientations.

5 Claims, 4 Drawing Figures

CONSTANT SPEED RATIO COUPLING FOR SHAFTS WITH TIME-VARYING ORIENTATIONS

BACKGROUND OF THE INVENTION

Couplings used to connect shafts are required for many purposes. A brief list of examples could include frontwheel drives of automobiles, automatic assembly and processing machinery, certain machine tools, precision instruments, and automatic control devices. The literature dealing with this subject in general is extensive and a comprehensive list of references in which the subject is discussed in its various aspects may be found in a recent book by Dudita, Dudita Fl. *Cuplaje mobile homocinetice*. Editura Teknica, Bucharest, 1974, pp. 226–228.

To perform satisfactorily in many of the above and other applications, a coupling should be constructed in such a way that it readily permits changes in relative shaft orientation during operation and maintains the ratio of input to output shaft speed constant for all input shaft speeds and all relative shaft orientations lying in a certain range. Thus, a coupling should not only insure a constant speed ratio in various orientations, but also insure a constant speed ratio during a change from one relative orientation to another.

An example of a coupling in which the ratio of the speeds of rotation of a pair of shafts about their respective axes varies as the axes undergo relative time-varying reorientations is a Hooke coupling. Probably the most widely known use of the Hooke coupling is the use to which it is put as a universal joint which couples a pair of shaft members in the drive line of an automobile and other motor vehicles.

In many motor vehicles the axes of the shaft members coupled by the joint may be considered as being nearly collinear — that is to say, an angle $\theta$ which the axis of one shaft member makes with the axis of the other shaft member is very small. Under these conditions, the ratio of the speeds of rotation, $\gamma$, of the shaft members about their respective axes is given, for a Hooke coupling, by the equation $$\gamma \approx 1 + (\dot\theta/\omega)\, \theta \sin\phi \cos\phi$$

where $\omega$ is the angular speed of one of the shafts, $\phi$ is the angular displacement of this shaft about its axis of rotation with respect to a given reference plane in which both shaft axes are fixed, and $\dot\theta$ is the time derivative of $\theta$. From the foregoing equation, it can be seen that sufficiently large values of $\dot\theta$ can give rise to appreciable fluctuations in the speed ratio, $\gamma$. Such values of $\dot\theta$ may be encountered when a vehicle traverses a bumpy road at relatively high speed. They may also be encountered in equipment using such couplings which is subject to high frequency vibrations such as equipment used in aircraft, ships, rockets and the like.

SUMMARY OF THE INVENTION

In view of the foregoing, a principal object of the present invention is a shaft coupling for coupling a pair of shafts D and N such that the ratio of the speeds of rotation of said shafts about their respective axes of rotation is maintained constant even as said axes undergo relative time-varying re-orientations.

A component of the coupling is a so-called differential mechanism. The mechanism is provided as a subsystem of the coupling and comprises a rigid housing, A. One of the pair of shafts, D and N - namely, D - which the coupling is intended to join is rotatably fitted by means of the housing and a plurality of gear members to a pair of internal coaxial shaft members, B and C, for bringing about a certain relationship between the angular speeds of the three shafts, B, C and D, in the reference frame A such that $$^A\omega^D = -R_1\,(^A\omega^B + {}^A\omega^C)$$

where $R_1$ is a constant. The nomenclature $^A\omega^D$, $^A\omega^B$ and $^A\omega^C$ follow the generalized form $^V\omega^U$ which is defined as the angular velocity of a body (shaft) U in a body (reference frame) V.

The shafts B and C are also rotatably supported by another rigid frame member, M, and, by means of another plurality of gears, are rotatably fitted to the other of the shafts, D and N - namely, N. Certain ones of the latter plurality of gears are provided to have predetermined pitch radii and to mesh for providing the constant speed ratio for the shafts D and N as described above.

DESCRIPTION OF THE DRAWINGS

The above and other objects, features and advantages of the present invention will become apparent from the following detailed description of the accompanying drawings in which.

DETAILED DESCRIPTION

Figure 1:
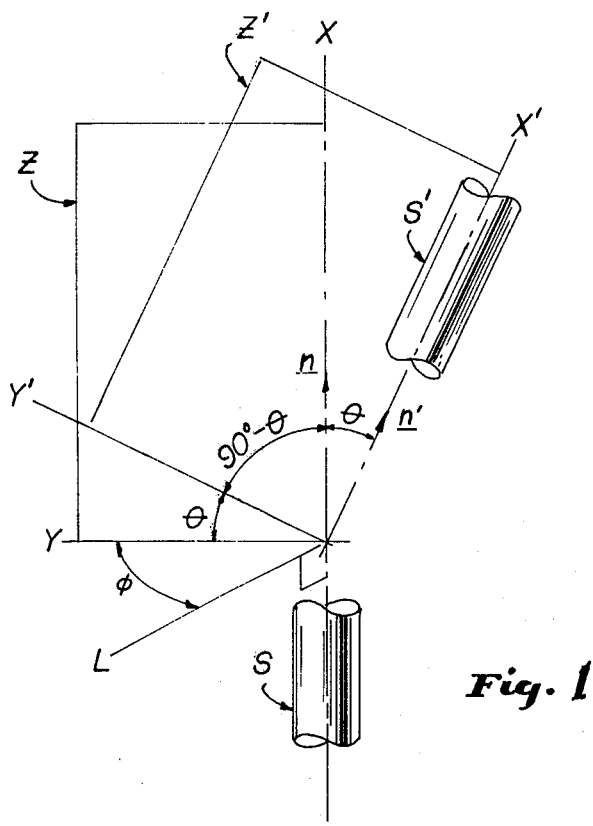
FIG. 1 is a diagram of coordinates and reference frames of a generalized coupling.

Referring to FIG. 1, the most general coupling of the kind to be considered can be discussed by reference to FIG. 1, where S and S' represent portions of the two shafts to be connected by a coupling (not shown); X and X' are respectively the axes of S and S', while Y and Y' are lines respectively perpendicular to X and X' and lying in the plane determined by X and X'; and Z designates a reference frame in which X and Y are fixed, while Z' is a reference frame in which X' and Y' are fixed.

Suppose now that $^Z\omega^S$ and $^{Z'}\omega^{S'}$ denote respectively the angular velocity of S in Z and the angular velocity of S' in Z'. Then $^Z\omega^S$ and $^{Z'}\omega^{S'}$ are necessarily respectively parallel to X and X', and, if $n$ and $n'$ are unit vectors respectively parallel to X and X' (see FIG. 1), one can write $$^Z\omega^S = \omega n\,,\quad {}^{Z'}\omega^{S'} = \omega' n' \qquad (1)$$

where $\omega$ and $\omega'$ are certain scalars, called respectively the angular speed of S in Z and the angular speed of S' in Z'; and $\gamma$, defined as $$\gamma = \omega'/\omega \qquad (2)$$

can be termed the speed ratio of the system formed by S, S', and the coupling that connects S and S'.

In principle, $\omega'$, and hence $\gamma$, can depend on not only $\omega$, but also the angle $\theta$ (see FIG. 1), the time-derivative $\dot{\theta}$ of $\theta$, and the rotation angle $\phi$ of S in Z, that is the angle between a line that is fixed in S and perpendicular to X, such as the line L in FIG. 1, and a line that is fixed in Z and perpendicular to X, such as line Y. This sort of dependence arises, for example, when S and S' are connected by a Hooke coupling.

Figure 2:
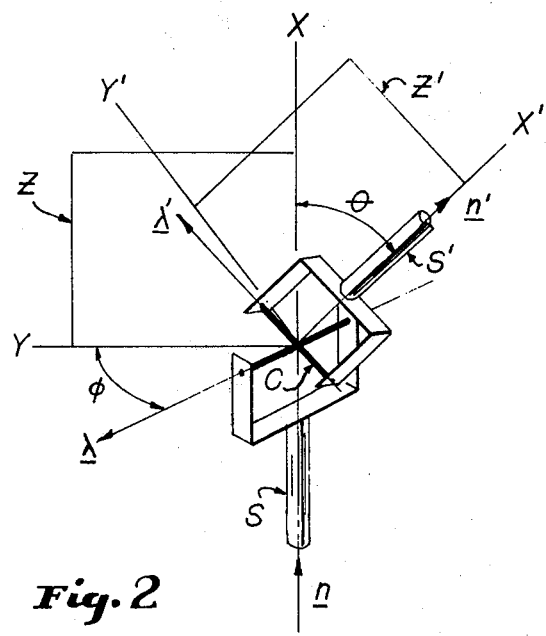
FIG. 2 is a diagrammatic representation of a Hooke coupling.

Referring to FIG. 2, there is shown a Hooke coupling. Specifically, as will be shown presently, $\gamma$ for this system is given by $$\gamma = \frac{\cos \theta + (\dot{\theta}/\omega) \sin \theta \sin \phi \cos \phi}{1 - \sin^2 \theta \cos^2 \theta} \quad (3)$$

Clearly, couplings could be classified in terms of the functional dependence of $\gamma$ on $\omega$, $\theta$, $\dot{\theta}$, and $\phi$; and wide acceptance of such a classification scheme would facilitate communication. A modest first step in this direction is to define as a "constant speed ratio coupling for shafts with time-varying orientations", a coupling such that $\gamma$ is a constant, that is, does not depend on $\omega$, $\theta$, $\dot{\theta}$, and $\phi$. This is the sense in which the phrase is used in the present application.

Throughout the sequel, the angular velocity of a body U in a reference frame V (or, equivalently, relative to a body V) is denoted by $^V\omega^U$. Using the addition theorem for angular velocities, one can thus write, for any coupling, $$^S\omega^{S'} = {^S\omega^Z} + {^Z\omega^{Z'}} + {^{Z'}\omega^{S'}} \quad (4)$$

Applied to Hooke's joint, this theorem yields $$^S\omega^{S'} = {^S\omega^C} + {^C\omega^{S'}} \quad (5)$$

where C designates the coupling member of the joint (see FIG. 2). Furthermore, in accordance with FIG. 2, $$^Z\omega^{Z'} = \dot{\theta} n \times n'/\sin \theta \quad (6)$$

and, if $\lambda$ and $\lambda'$ are unit vectors directed as shown, $$^S\omega^C = s\lambda, \quad ^C\omega^{S'} = s'\lambda' \quad (7)$$

where $s$ and $s'$ are certain scalars. Equating the right-hand members of Eqs. (4) and (5), and using Eqs. (1), (6), and (7), one thus obtains $$-\omega n + \dot{\theta} n \times n'/\sin \theta + \omega' n' = s \lambda + s'\lambda' \quad (8)$$

from which it follows by scalar multiplication with $\lambda \times \lambda'$ that $$-\omega n.(\lambda \times \lambda') + \omega' n'.(\lambda \times \lambda') + \dot{\theta}(n \times n') . (\lambda \times \lambda')/\sin \theta = 0 \quad (9)$$

Moreover, $\lambda' = \pm \lambda \times n'$, since $\lambda'$ is perpendicular to both $\lambda$ and $n'$. Consequently, $$\lambda \times \lambda' = \pm \lambda \times (\lambda \times n') = \pm (\lambda.n'\lambda - n') \quad (10)$$

so that $$n.(\lambda \times \lambda') = \pm n.n' = \pm\cos \theta \quad (11)$$

$$(n \times n') . (\lambda \times \lambda') = \pm \lambda.n'(n \times n') . \lambda = \pm \sin \theta \sin \phi \cos \phi \quad (12)$$

$$n' . (\lambda \times \lambda') = \pm(\lambda.n')^2 \pm 1 = \pm(1 - \sin^2\theta \cos^2\phi) \quad (13)$$

which makes it possible to re-write Eq. (9) as $$\omega\cos \theta + \dot{\theta} \sin \theta \sin \phi \cos \phi - \omega'(1 - \sin^2\theta \cos^2\phi) = 0 \quad (14)$$

Solving Eq. (14) for $\omega'$ and substituting into Eq. (2), one arrives at Eq. (3).

Before leaving Eq. (3), it is worth pointing out that the term involving $\dot{\theta}$ (which is sometimes ignored in the literature on this subject) can be physically important. Suppose, for example, that $\theta$ is very small, as in many automotive applications. Then Eq. (3) may be replaced with $$\gamma \approx 1 + (\dot{\theta}/\omega) \theta \sin \phi \cos \phi \quad (15)$$

and it can be seen that sufficiently large values of $\dot{\theta}$ can give rise to appreciable fluctuations in the speed ratio. Such values of $\dot{\theta}$ may be encountered when a vehicle traverses a bumpy road at relatively high speed.

Figure 3:
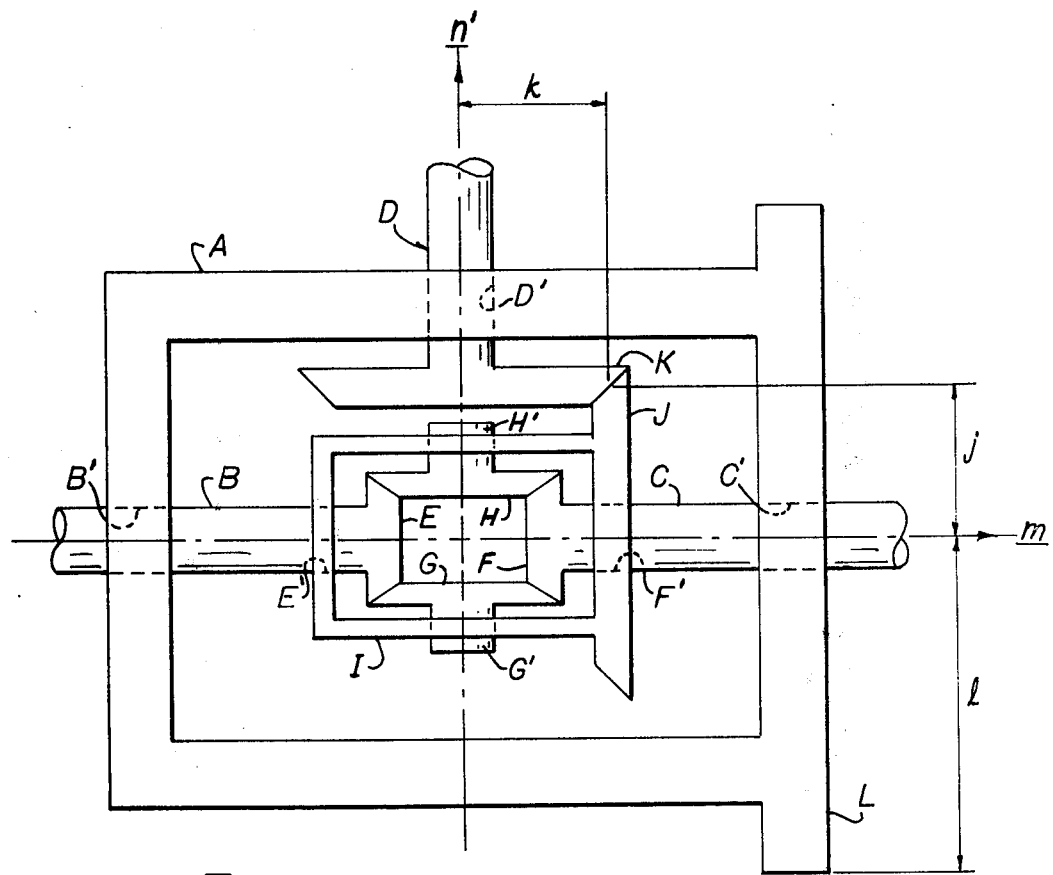
FIG. 3 is a cross-sectional view of a differential mechanism constituting a subsystem of the present invention.
Figure 4:
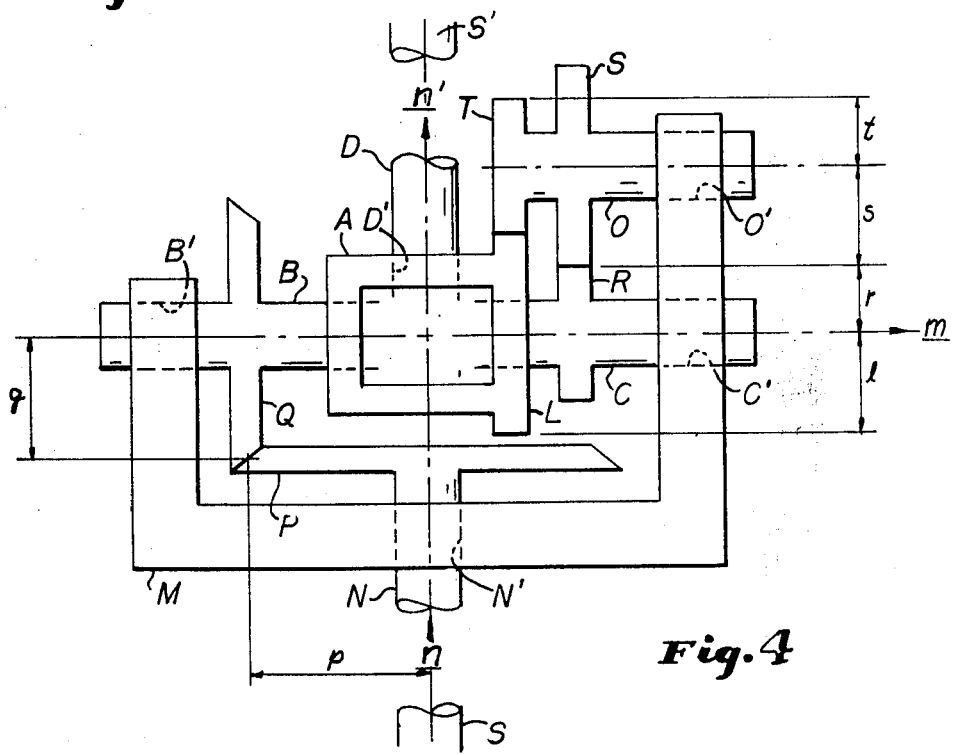
FIG. 4 is a cross-sectional view of an embodiment of the present invention including the sybsystem of FIG. 3.

Referring to FIGS. 3 and 4, there is provided a coupling according to the present invention for coupling a pair of rotatable shafts D and N which correspond respectively to shafts S' and S in FIGS. 1 and 2. The coupling to be described contains a so-called differential mechanism as a subsystem. FIG. 3 shows such a mechanism in schematic form. Its function is to bring about a certain relationship between the angular speeds of the shaft D and two coaxial shafts B and C rotatably supported in bores D', B' and C', respectively, in a rigid body A. Specifically, if $m$ and $n'$ are unit vectors fixed in a body A and perpendicular to each other, and if the axes of shafts B and C are parallel to $m$ while that of shaft D is parallel to $n'$, so that the angular velocities of B, C, and D in A can be expressed as $$^A\omega^B = {^A\omega^B}m, \quad ^A\omega^C = {^A\omega^C}m, \quad ^A\omega^D = {^A\omega^D}n' \quad (16)$$

then one can ensure that $$^A\omega^D = -R_1(^A\omega^B + {^A\omega^C}) \quad (17)$$

where $R_1$ is a constant (presently to be expressed as a ratio of two lengths). As shown in FIG. 3, this is accomplished by keying a pair of bevel gears E and F to B and C, respectively, and permitting these to engage a pair of bevel gears G and H which are free to rotate on pins G' and H' rotatably fixed in a casing I, this casing, in turn, being free to rotate about the common axis of B and C which projects through a pair of bores E' and F' in the casing. Furthermore, a bevel gear J is rigidly attached to I, and this meshes with a bevel gear K keyed to D. The constant $R_1$ is then given by the familiar relationship $$R_1 = j/2k \quad (18)$$

where $j$ and $k$ are the pitch radii of J and K, respectively.

FIG. 3 contains one more element of interest, namely a spur gear L that is rigidly attached to A and has a pitch radius $l$. This is not a part of a conventional differential mechanism, but it is required for the coupling of the present invention.

In FIG. 4, A, B, C, D, and L designate elements previously shown in FIG. 3. The elements interior to A in FIG. 3 are omitted for clarity in FIG. 4. In addition, there is provided a rigid member M which represents a carrier that supports the shafts B and C, as well as shaft N and a shaft O. Furthermore, there is provided a pair of bevel gears P and Q which are keyed to shafts N and B, respectively, and a plurality of spur gears R, S and T that are keyed to shafts C and O. P meshes with Q, R with S, and L with T. In its entirety, the coupling is thus formed by A, B, — T, N and D being the elements corresponding to shafts S and S'. (The axes of S and S' (or N and D) are shown aligned with each other in FIG. 4 only for convenience of representation. They can, in fact, form an angle in excess of ninety degrees with each other.)

The bodies A and M can rotate relative to each other only about a line parallel to the unit vector $m$ shown in FIG. 4; and N (or S) must rotate about a line fixed in M and parallel to $n$ (see FIG. 4), while D (or S') is constrained to rotate about a line fixed in A and parallel to $n'$. M and A can, therefore, be identified respectively with Z and Z' of FIG. 1, while ${}^M\omega^N$ and ${}^A\omega^D$ play the roles of $\omega$ and $\omega'$, respectively, in Eqs. (1) if ${}^M\omega^N$ is expressed as ${}^M\omega^N = {}^M\omega^N n$ (see the third of Eqs. (16) for ${}^A\omega^D$). In accordance with Eq. (2), the speed ratio for the coupling is thus given by $$\gamma = {}^A\omega^D / {}^M\omega^N \tag{19}$$

It will now be shown that $\gamma$ is a constant, provided the pitch radii $l$, $r$, $s$, and $t$ of gears L, R, S, and T, respectively, (see FIG. 4) satisfy the equations $$ls/rt = 2 \tag{20}$$

and $$r + s = t + l \tag{21}$$

The second of these ensures that R meshes with S when T meshes with L. As for the first, one may begin by observing that, if ${}^M\omega^B$ is expressed as ${}^M\omega^B = {}^M\omega^B m$, then $$ {}^M\omega^N = - R_2 \, {}^M\omega^B \tag{22}$$

where $R_2$ is defined as $$R_2 = q/p \tag{23}$$

in which $p$ and $q$ are the pitch radii of the gears P and Q. Furthermore, using the addition theorem for angular velocities once again, one has, after expressing ${}^A\omega^B$ and ${}^A\omega^M$ as ${}^A\omega^B = {}^A\omega^B m$ and ${}^A\omega^M = {}^A\omega^M m$, $$ {}^A\omega^B = {}^A\omega^M + {}^M\omega^B \tag{24}$$

or, after using Eq. (22) to eliminate ${}^M\omega^B$, $$ {}^A\omega^B = {}^A\omega^M - {}^M\omega^N / R_2 \tag{25}$$

Next, if $R_3$ is defined as $$R_3 = l/t \tag{26}$$

and ${}^M\omega^O$ is expressed as ${}^M\omega^O = {}^M\omega^O m$, then $$ {}^M\omega^O = - R_3 {}^M\omega^A \tag{27}$$

or, since ${}^M\omega^A = - {}^A\omega^M$, $$ {}^M\omega^O = R_3 {}^A\omega^M \tag{28}$$

Similarly, with ${}^M\omega^C$ expressed as ${}^M\omega^C = {}^M\omega^C m$, one can write $$ {}^M\omega^C = - R_4 {}^M\omega^O \tag{29}$$

where $R_4$ is defined as $$R_4 = s/r \tag{30}$$

so that, after elimination of ${}^M\omega^O$ by use of Eq. (28), one has $$ {}^M\omega^C = -R_3 R_4 {}^A\omega^M \tag{31}$$

This, together with the addition theorem applied to A, M and C, that is, with $$ {}^A\omega^C = {}^A\omega^M + {}^M\omega^C \tag{32}$$

yields $$ {}^A\omega^C = {}^A\omega^M (1 - R_3 R_4) \tag{33}$$

and, using this result together with Eq. (25) in Eq. (17), one can now express ${}^A\omega^D$ as $$ {}^A\omega^D = - R_1 [{}^A\omega^M (2 - R_3 R_4) - {}^M\omega^N / R_2 ] \tag{34}$$

Consequently, if $2 - R_3 R_4$ vanishes, which is the case whenever Eq. (20) is satisfied (see Eqs. (26) and (30) for $R_3$ and $R_4$), then $$ {}^A\omega^D / {}^M\omega^N = R_1 / R_2 \tag{35}$$

and substitution into Eq. (19) produces, in view of Eqs. (18) and (23), $$\gamma = jp/2kq \tag{36}$$

so that $\gamma$ is, indeed, a constant. Moreover, the speed ratio evidently can take on values lying in a wide range, for $j$, $k$, $p$ and $q$ each can be chosen with considerable latitude.

When the axis of D (FIG. 4) is nearly perpendicular to that of N, small changes in the orientation of the axis of D in any reference frame in which the axis of N is fixed are accompanied by minimal motions of other parts of the mechanism; and such changes can be made in any plane passing through the point of intersection of the axes of D and N. Hence the coupling may be expected to perform especially well under these circumstances. The only situation in which the axis of D does not possess complete freedom of movement is that depicted in FIG. 4, for the axis of D cannot move in the plane determined by the axes of B and N. This state of affairs should probably be avoided, since it tends to bring excessively large forces into play. However, even in this situation, the coupling performs in accordance with Eq. (36).

It is apparent from the foregoing that the coupling formed of elements A, . . . , T arranged as shown in FIGS. 3 and 4 has the constant speed ratio given by Eq. (36) whenever Eqs. (20) and (21) are satisfied and that the speed ratio is solely dependent on the pitch radii of bevel gears, whereas the constraint relations involve the pitch radii of spur gears.

While a specific embodiment of the invention is disclosed, it is understood that various other sizes, types and arrangements of the gears within the constraints prescribed herein may be employed. Likewise it is apparent that the gears and shafts employed may be held in rigid body structures having shapes other than those shown for rigid body members A, I and M. It is also understood that while only a coupling for shafts having intersecting axes of rotation is described, a constant speed ratio for shafts having non-intersecting axes of rotation is possible with the use of an appropriate arrangement of shafts and gears, without departing from the spirit and scope of the present invention. For example, the axis of shaft N can be placed in such a way that it never intersects the axis of shaft D.

Accordingly, it is intended that the scope of the invention should not be limited to the embodiment described but, rather, be determined by the claims hereinafter provided.

What is claimed is:

1. A shaft coupling comprising:
   a first rigid body (A);
   a second rigid body (M);
   means (shafts B and C) for rotatably coupling said first and said second rigid bodies (A and M) such that said bodies are rotatable relative to each other about a common axis (m);
   a first shaft means (D) having an axis of rotation (n') mounted for rotation in said first rigid body (A);
   a second shaft means (N) having an axis of rotation (n) mounted for rotation in said second rigid body (M); and
   means (gears E, F, G, H, J, K, L, P, Q, R, S and T) for coupling said first shaft means (D) to said second shaft means (N) whereby the ratio of the speed of rotation of said first shaft means (D) about its axis of rotation (n') relative to said first rigid body (A) and the speed of rotation of said second shaft means (N) about its axis of rotation (n) relative to said second rigid body (M) is maintained constant when said first and said second rigid bodies (A and M) are rotated relative to each other about said common axis (m).

2. A shaft coupling according to claim 1 wherein said means for rotatably coupling said first and said second rigid bodies (A and M) comprises a third and a fourth shaft means (B and C) and said means for coupling said first and said second shaft means (D and N) comprises gear means (E, F, G, H, J, K, L, P, Q, R, S and T).

3. A shaft coupling according to claim 2 wherein said gear means comprises:
   a differential mechanism coupled to said first shaft means (D) and said third and fourth shaft means (B and C) for maintaining a predetermined relationship between the angular speeds of said first shaft means (D) and said third and fourth shaft means (B and C);
   gear means (P and Q) for coupling said third shaft means (B) to said second shaft means (N); and
   gear means (L, R, S, and T) for coupling said fourth shaft means (C) to said rigid body (A).

4. A shaft coupling for coupling a first shaft (D) and a second shaft (N), each of said shafts (D and N) having an axis of rotation, which axes are movable relative to each other defining a variable angle therebetween, comprising:
   a pair of shafts (B and C), each having an axis of rotation;
   a first rigid member (A) having a pair of spaced coaxial bores for rotatably receiving said pair of shafts (B and C), and a bore for rotatably receiving said first shaft (D), said bores in said first member (A) serving to maintain said axes of rotation of said pair of shafts (B and C) collinear and said axis of rotation of said first shaft (D) perpendicular to said axes of rotation of said pair of shafts (B and C);
   a first plurality of bevel gears (E, F and K), fitted, respectively, to one end of said pair of shafts (B and C) and said first shaft (D);
   a second plurality of bevel gears (G and H), each fitted with a pin member;
   a second rigid member (I) having a first pair of spaced coaxial bores for rotatably receiving said pair of shafts (B and C) and a second pair of spaced coaxial bores for rotatably supporting, by means of said pin members, said second plurality of bevel gears (G and H) in rotatable engagement with said first plurality of bevel gears (E and F);
   a first bevel gear (J) rigidly fitted to said second rigid member (I) for rotatably engaging one of said first plurality of bevel gears (K), said first bevel gear (J) and said one of said first plurality of bevel gears (K) each having a pitch radius, the ratio of which is equal to a constant;
   a first spur gear (L) rigidly fitted to said first rigid member (A);
   a third shaft (O), said third shaft (O) having an axis of rotation;
   a third member (M) having a pair of spaced coaxial bores for rotatably receiving said pair of shafts (B and C), a bore for rotatably receiving said third shaft (O) and maintaining said axis of rotation of said third shaft (O) parallel to said axes of rotation of said pair of shafts (B and C), and a
   bore for rotatably receiving said second shaft (N) and maintaining said axis of rotation of said second shaft (N) perpendicular to said axes of rotation of said pair of shafts (B and C);
   a second bevel gear (Q) fitted to one of said pair of shafts (B);
   a third bevel gear (P) fitted to one end of said second shaft (N) for rotatably engaging said second bevel gear (Q);
   a second spur gear (R) fitted to said other of said pair of shafts (C); and
   a third and fourth spur gears (S and T) fitted to said third shaft (O) for rotatably engaging said second and said first spur gears (R and L), respectively, said spur gears (L, R, S, and T) having pitch radii such that the product of the pitch radii of said first and said third spur gears (L and S) is equal to twice the product of the pitch radii of said second and said fourth spur gears (R and T) while the sum of the pitch radii of said second and said third spur gears (R and S) is equal to the sum of the pitch radii of said first and said fourth spur gears (L and T), for maintaining constant the ratio of the speed of rotation of said first shaft (D) relative to said first rigid member (A) and said second shaft (N) relative to said third rigid member (M) irrespective of any change in the angle between said axes of rotation of said first and said second shafts (D and N).

5. A shaft coupling comprising:
   a differential assembly having a first rigid body member (A) for rotatably coupling a first shaft (D) having an axis of rotation perpendicular to a pair of coaxial shafts (B and C) to bring about a predetermined relationship between the angular speeds of said shafts in one reference frame;
   a second rigid body member (M) for rotatably supporting said pair of shafts (B and C);

a third shaft (O) in parallel with said pair of shafts (B and C) and a second shaft (N) having an axis of rotation perpendicular to said pair of shafts (B and C) and said third shaft (O); and a plurality of gear means fitted to said shafts (B, C, O and N) and said first body member (A) for rotatably coupling said second shaft N to said first shaft (D) whereby the ratio of the speed of rotation of said first shaft (D) relative to said first rigid body member (A) and said second shaft (N) relative to said second rigid body member (M) is maintained constant even when there is relative angular motion of said axes.

* * * * *